United States Patent
Li et al.

(10) Patent No.: US 12,348,035 B2
(45) Date of Patent: Jul. 1, 2025

(54) POWER SUPPLY SYSTEM AND TOPOLOGY DETECTION METHOD

(71) Applicant: Huawei Digital Power Technologies Co., Ltd., Shenzhen (CN)

(72) Inventors: Lin Li, Shanghai (CN); Qinwei Liu, Shenzhen (CN); Mingwei Xu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/484,724

(22) Filed: Oct. 11, 2023

(65) Prior Publication Data

US 2024/0039278 A1 Feb. 1, 2024

Related U.S. Application Data

(63) Continuation of application No. PCT/CN2021/086961, filed on Apr. 13, 2021.

(51) Int. Cl.
*H02J 3/00* (2006.01)
*H02J 3/38* (2006.01)

(52) U.S. Cl.
CPC ............ *H02J 3/0012* (2020.01); *H02J 3/38* (2013.01); *H02J 2300/24* (2020.01)

(58) Field of Classification Search
CPC ......... H02J 3/0012; H02J 3/38; H02J 2300/24
USPC .......................................................... 307/43
See application file for complete search history.

(56) References Cited

U.S. PATENT DOCUMENTS

| 7,138,924 B2 | 11/2006 | Curtis |
| 2003/0097438 A1 | 5/2003 | Bearden et al. |

FOREIGN PATENT DOCUMENTS

| CN | 104011957 A | 8/2014 |
| CN | 109061541 A | 12/2018 |
| CN | 109256856 A | 1/2019 |

(Continued)

OTHER PUBLICATIONS

Pan et al., "Research on topology identification method of low-voltage station based on operational disturbance data analysis", Electrical Measurement and Instrumentation, Feb. 24, 2021, XP055977614, 9 pages (English abstract provided).

(Continued)

*Primary Examiner* — Hal Kaplan
(74) *Attorney, Agent, or Firm* — Maier & Maier, PLLC

(57) ABSTRACT

Any one of a plurality of to-be-grouped devices in a power supply system reports an initial bus voltage to a topology detection device; and reports a current bus voltage after delivering a bus voltage adjustment instruction to a target reference device. The bus voltage adjustment instruction instructs the target reference device to adjust a voltage. The target reference device receives the bus voltage adjustment instruction and adjusts the voltage according to the bus voltage adjustment instruction. The topology detection device obtains the initial bus voltage and the current bus voltage of the plurality of to-be-grouped devices, and determines, based on a difference between the initial bus voltage of the plurality of to-be-grouped devices and the current bus voltage of the plurality of to-be-grouped devices, whether the target reference device and a target to-be-grouped device are connected to a same bus.

17 Claims, 7 Drawing Sheets

(56) References Cited

FOREIGN PATENT DOCUMENTS

WO  WO-2013070836 A2 *  5/2013  ................ H02J 3/00

OTHER PUBLICATIONS

Bologlani et al., "Identification of power distribution network topology via voltage correlation analysis", 52nd IEEE Conference on Decision and Control, Dec. 10-13, 2013, pp. 1659-1664.

* cited by examiner

POWER SUPPLY SYSTEM AND TOPOLOGY DETECTION METHOD

CROSS-REFERENCE TO RELATED APPLICATIONS

This application is a continuation of International application No. PCT/CN2021/086961, filed on Apr. 13, 2021, the disclosure of which is hereby incorporated by reference in its entirety.

TECHNICAL FIELD

The embodiments relate to the field of electronic power, a power supply system, and a topology detection method.

BACKGROUND

With development of market demands and technologies, demands for a high-power supply system become increasingly high. A photovoltaic power supply system is a new power supply system that directly converts solar radiation energy into electric energy based on photovoltaic effect of a photovoltaic panel. Refer to a photovoltaic power supply system shown in FIG. 1. The photovoltaic power supply system may include devices such as a photovoltaic power converter, an inverter, and an energy storage power converter. A function of the photovoltaic power converter is to control unstable electric energy generated by a photovoltaic panel to be a stable, voltage-controllable, and highly efficient direct current output for use by the energy storage power converter and the inverter. A function of the inverter is to convert a direct current provided by the photovoltaic power converter and the energy storage power converter into an alternating current and then transmit the alternating current to a power grid. A function of the energy storage power converter is to directly store a direct current output by the photovoltaic power converter for use by a load. In addition, when insolation is large, the energy storage power converter not only supplies power to the load, but also charges a battery. When the insolation is small, the energy storage power converter controls the battery to gradually discharge the stored energy.

To implement functions such as control of a bus voltage under different working conditions and power allocation between devices, topological structures of devices in various power supply systems need to be identified, and devices mounted to different buses need to be determined. However, a high-power supply system is characterized by large quantities of devices, complex cable connections and a long geographical distance. Manually identifying a topological structure of a device has problems such as high costs, consumption of long time, and a high false identification rate. In view of this, how to quickly and cost-effectively determine devices mounted to different buses in the high-power supply system is a problem to be urgently resolved in this field.

SUMMARY

The embodiments provide a power supply system and a topology detection method that are used to quickly and cost-effectively determine devices mounted to different buses in a high-power supply system.

According to a first aspect, the embodiment provides a power supply system. The power supply system includes a plurality of to-be-grouped devices and at least one bus. Each bus is connected to at least one to-be-grouped device. The to-be-grouped device includes: a power converter and an inverter. The power converter is configured to output a direct current to the inverter, and the inverter is configured to: reverse the direct current into an alternating current and transmit the alternating current to a power grid. Any one of the plurality of to-be-grouped devices is configured to: report an initial bus voltage of a connected bus to a topology detection device; and after the topology detection device delivers a bus voltage adjustment instruction to a target reference device, report a current bus voltage of the connected bus to the topology detection device. The target reference device is any to-be-grouped device in the power supply system. The topology detection device is any device in the power supply system. The bus voltage adjustment instruction instructs the target reference device to adjust a voltage of the connected bus. The target reference device is configured to: receive the bus voltage adjustment instruction and adjust the voltage of the connected bus according to the bus voltage adjustment instruction. The topology detection device is configured to: obtain the initial bus voltage and the current bus voltage of the bus connected to the plurality of to-be-grouped devices, and determine, based on a difference between the initial bus voltage of the bus connected to the plurality of to-be-grouped devices and the current bus voltage of the bus connected to the plurality of to-be-grouped devices, whether the target reference device and a target to-be-grouped device are connected to a same bus.

Optionally, when the power supply system is a photovoltaic power supply system, the topology detection device may be an inverter, a photovoltaic power converter, an energy storage power converter, or the like. In addition, the topology detection device may be a data collection gateway. The data collection gateway may be disposed independently of the to-be-grouped device, or inside the to-be-grouped device such as the power converter or the inverter, and may obtain, through the data collection gateway, the initial bus voltage and the current bus voltage of the bus connected to the plurality of to-be-grouped devices, to implement functions of the topology detection device and thus identify a topological structure between the to-be-grouped device and the bus in the power supply system.

The topology detection device in the power supply system may deliver the bus voltage adjustment instruction to the target reference device in the power supply system, so that the target reference device adjusts the voltage of the bus connected to the target reference device. Then, the topology detection device may determine, in the to-be-grouped device in the power supply system, a difference between bus voltages generated before and after the bus voltage of the target reference device is adjusted, to determine whether the target reference device and the target to-be-grouped device are connected to the same bus. Apparently, with this solution, the topological structure between the to-be-grouped device and the bus in the power supply system can be identified by determining a change of a bus voltage.

The topology detection device may be further configured to: deliver a bus reset instruction to each of the to-be-grouped devices before obtaining the initial bus voltage of the bus connected to the plurality of to-be-grouped devices. The bus reset instruction instructs each of the to-be-grouped devices to adjust the voltage of the connected bus to a preset voltage. Any one of the plurality of to-be-grouped devices is further configured to: receive the bus reset instruction and adjust the voltage of the connected bus to the preset voltage according to the bus reset instruction. The foregoing manner can solve a problem that voltages of connected buses are different due to a change of a load of a power grid or the like, so that voltages on all buses in the power supply system are adjusted to a same voltage value, and no topology detection error will be caused in subsequent topology detection.

The target reference device may be further configured to: send a voltage adjustment completion message to the topology detection device after adjusting the voltage of the connected bus from a first bus voltage to a second bus voltage. The topology detection device is further configured to: before obtaining the current bus voltage of the bus connected to the plurality of to-be-grouped devices, receive the voltage adjustment completion message sent by the target reference device. The voltage adjustment completion message is used to inform that the target reference device adjusts the voltage of the connected bus from the first bus voltage to the second bus voltage, and the second bus voltage is different from the first bus voltage. The foregoing manner can ensure that the target reference device has adjusted the voltage of the connected bus from the first bus voltage to the second bus voltage when topology detection is performed and can further improve a topology detection speed.

A difference between the second bus voltage and the first bus voltage may be greater than a specified threshold or a ratio of the second bus voltage to the first bus voltage may be a specified ratio. Setting the difference between the second bus voltage and the first bus voltage as the foregoing parameter can both ensure that the difference between the second bus voltage and the first bus voltage can be identified by a bus voltage detection apparatus and implement topology detection in a case of low power consumption. In addition, the topology detection device may be a power converter or an inverter, so that topology detection can be flexibly performed in the power supply system, thereby reducing difficulty of topology detection.

According to a second aspect, the embodiment provides a power supply system. The power supply system includes a plurality of to-be-grouped devices and at least one bus. Each bus is connected to at least one to-be-grouped device. The to-be-grouped device includes: a power converter and an inverter. The power converter is configured to output a direct current to the inverter. The inverter is configured to: reverse the direct current into an alternating current and transmit the alternating current to a power grid. Any one of the plurality of to-be-grouped devices is configured to: after a topology detection device delivers a bus disturbance instruction to a target reference device, report a voltage disturbance frequency on a connected bus to the topology detection device. The target reference device is any to-be-grouped device in the power supply system. The topology detection device is any device in the power supply system. The bus disturbance instruction instructs the target reference device to continuously generate a voltage disturbance on the connected bus. The target reference device is configured to: receive the bus disturbance instruction and perform a voltage disturbance action according to the bus disturbance instruction, so that the target reference device generates the voltage disturbance on the connected bus. The topology detection device is configured to: obtain the voltage disturbance frequency of the bus connected to the plurality of to-be-grouped devices, and determine, based on a relationship between the voltage disturbance frequency of the bus connected to the plurality of to-be-grouped devices and a specified frequency threshold, whether the target reference device and a target to-be-grouped device are connected to a same bus.

The topology detection device in the power supply system may deliver the bus disturbance instruction to the target reference device in the power supply system, so that the target reference device generates the voltage disturbance on the connected bus. Then, the topology detection device may determine, in the plurality of to-be-grouped devices in the power supply system, whether the voltage disturbance frequency of the bus connected to each of the to-be-grouped devices is greater than the specified frequency threshold. Finally, the topology detection device may determine, based on the obtained relationship between the voltage disturbance frequency of the bus connected to the plurality of to-be-grouped devices and the specified frequency threshold, whether the target reference device and the target to-be-grouped device are connected to the same bus. It is clear that with this solution, the topology detection device may identify a topological structure between the to-be-grouped device and the bus in the power supply system based on a change of bus disturbance.

The target reference device may be further configured to: send a disturbance generation completion message to the topology detection device after performing the voltage disturbance action according to the bus disturbance instruction. The topology detection device is further configured to: before obtaining the voltage disturbance frequency of the bus connected to the plurality of to-be-grouped devices, receive the disturbance generation completion message sent by the target reference device. The disturbance generation completion message is used to inform that the target reference device generates the voltage disturbance on the connected bus. The foregoing manner can both ensure that the target reference device has generated the voltage disturbance on the connected bus during topology detection and improve a topology detection speed. In some possible implementations, the voltage disturbance may be in a form of a rectangular wave, a sawtooth wave, or a step wave.

A voltage disturbance frequency of a bus connected to the target reference device may be greater than a second frequency threshold. The foregoing manner allows the voltage disturbance generated by the target reference device on the connected bus to be identified, so that topology detection can be implemented in a case of low power consumption.

According to a third aspect, the embodiments may provide a topology detection method, applied to the topology detection device described in the first aspect. The method includes: obtaining an initial bus voltage and a current bus voltage of a bus connected to a plurality of to-be-grouped devices; and determining, based on a difference between the initial bus voltage of the bus connected to the plurality of to-be-grouped devices and the current bus voltage of the bus connected to the plurality of to-be-grouped devices, whether a target reference device and a target to-be-grouped device are connected to a same bus. For the corresponding solution in the third aspect, reference may be made to the corresponding solution in the first aspect. Repetitions are not described in detail.

According to a fourth aspect, the embodiment provides a topology detection method, applied to the topology detection device described in the second aspect. The method includes: obtaining a voltage disturbance frequency of a bus connected to a plurality of to-be-grouped devices; and determining, based on a relationship between the voltage disturbance frequency of the bus connected to the plurality of to-be-grouped devices and a specified frequency threshold, whether a target reference device and a target to-be-grouped device are connected to a same bus. For the corresponding solution in the fourth aspect, reference may be made to the corresponding solution in the second aspect. Repetitions are not described in detail.

These aspects are more readily apparent from the following description of the embodiments.

DETAILED DESCRIPTION OF THE EMBODIMENTS

Figure 1:
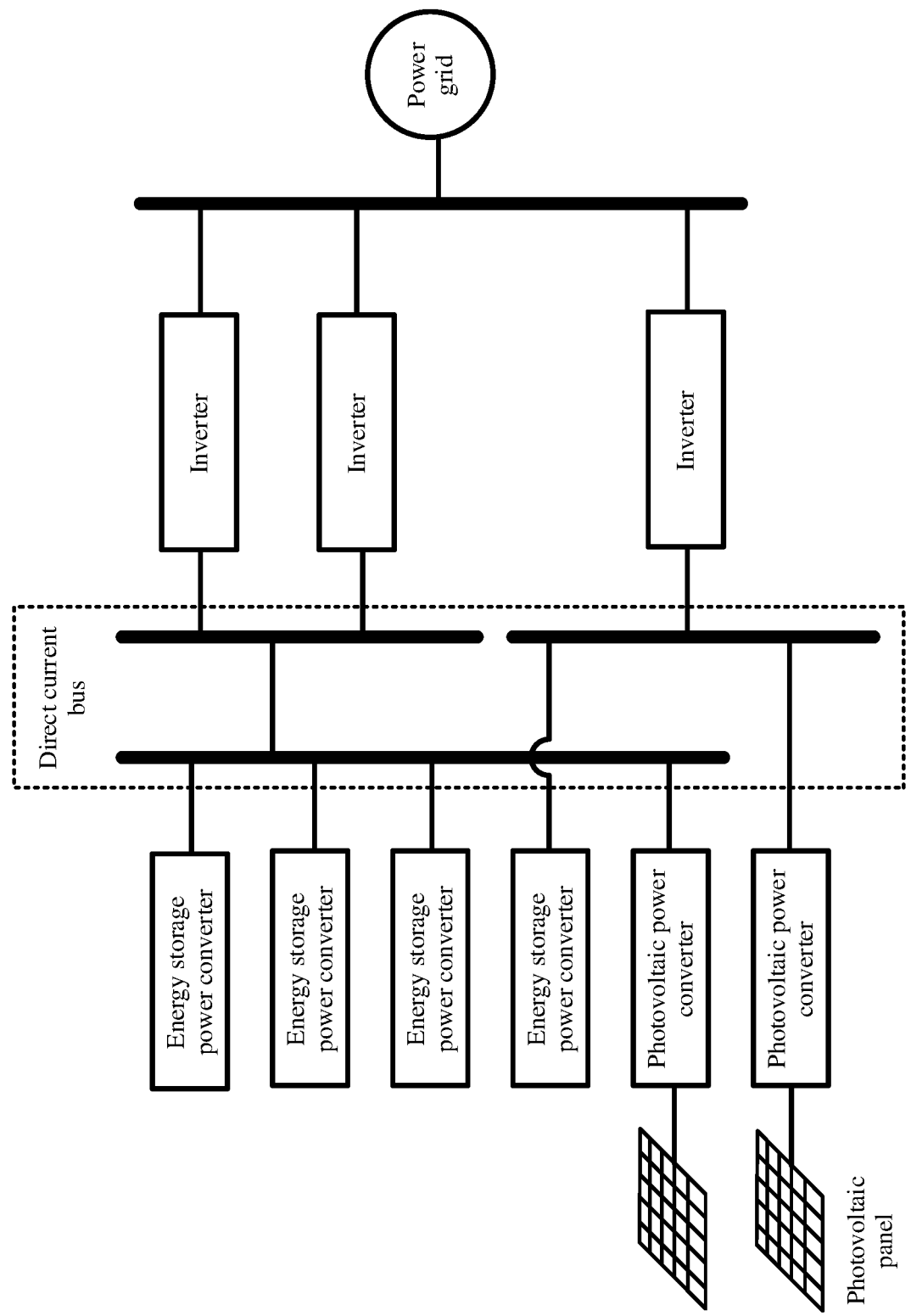
FIG. 1 is a schematic diagram of a structure of a photovoltaic power supply system.

In the following, some terms involved in the embodiments are first explained and described to facilitate easy understanding by a person skilled in the art.

(1) Maximum power point tracking (MPPT): An output power of a photovoltaic panel is calculated by detecting a voltage and a current that are output by the photovoltaic panel in real time, to implement tracking of the maximum power point. In this way, the photovoltaic panel can output more electric energy to a power grid, improving charging efficiency. MPPT control may be completed by using a DC/DC conversion circuit. The photovoltaic panel is connected to a load through the DC/DC conversion circuit. A device with a maximum power point tracking function adjusts a duty cycle of a PWM drive signal that drives the DC/DC conversion circuit by continuously detecting changes in the current and voltage output by the photovoltaic panel.

(2) High-speed power line carrier (HPLC): also referred to as a broadband power line carrier, which is a power line carrier technology that transmits data over low-voltage power lines. The high-speed power line broadband carrier is a communication network that uses power lines as communication media to aggregate, transmit, and exchange power utilization information of low-voltage power users. The high-speed power line carrier uses orthogonal frequency division multiplexing (OFDM) technologies in a frequency band of 2 MHz to 12 MHz. Compared with conventional low-speed narrowband power line carrier technologies, the HPLC technology with a high bandwidth and a high transmission rate can meet higher requirements of low-voltage power line carrier communication.

(3) Wave trap: a resonant circuit, or a sensor that automatically switches on or off. When applied to antenna engineering, a wave trap may automatically extend or shorten a length of an antenna based on a signal frequency. The wave trap may be a filter in a radio receiver that is configured to eliminate some unwanted signals to reduce interference to wanted signals.

(4) Data collection gateway: a secure and stable industrial data collection and conversion device. A data collection gateway is an intelligent device that integrates data collection, remote update, an industrial computer, and cloud service. The data collection gateway is applicable to remote collection management of various systems and devices.

To make the objectives, solutions, and advantages clearer, the following further describes the embodiments in detail with reference to the accompanying drawings.

It should be noted that, in the description, "at least one" means one or more, and "a plurality of" means two or more. In view of this, in the embodiments, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, the character "/", unless otherwise specified, may indicate an "or" relationship between the associated objects. In addition, it should be understood that terms such as "first" and "second" in the description are merely used for distinguishing and description but should not be understood as indicating or implying relative importance or should not be understood as indicating or implying a sequence.

To implement functions such as control of a bus voltage in a power supply system and power allocation between devices, topological structures of devices in various power supply systems need to be identified, and devices mounted to different buses need to be determined. However, a high-power supply system is characterized by large quantities of devices, complex cable connections and a long geographical distance. Manually identifying a topological structure of a device in the power supply system has problems such as high costs, long time taken, and a high false identification rate.

In some possible embodiments, topology of the device in the power supply system may be identified with high-speed power line broadband carrier technologies. A topology identification system for topology identification may include a signal sending apparatus and a signal receiving terminal. The signal sending apparatus is installed at an incoming end or an outgoing end of a transformer in the power supply system. A high-voltage power line broadband carrier communication module may be disposed inside the signal sending apparatus. The signal receiving terminal is installed at an incoming end or an outgoing end of a power converter. A wave trap may be disposed inside the signal receiving terminal. The wave trap is configured to block a signal whose frequency is a power frequency of 50 Hz. The signal sending apparatus obtains ID codes of all signal receiving terminals, sends signals to all signal receiving terminals, detects a current direction by controlling a state of the signal receiving terminals, and identifies, based on the current direction, a parent node connected to each power converter, so as to obtain a device topology diagram of the entire power supply system. However, this manner requires installation of a high-speed power line broadband carrier module, thereby increasing hardware costs. In addition, because a power line broadband carrier is used for communication, an interference risk exists, and a problem of misidentification may easily occur. In view of this, how to quickly and cost-effectively determine devices mounted to different buses in the power supply system is a problem to be urgently resolved in this field.

Embodiment 1

An embodiment provides a power supply system and a topology detection device. In this solution, the topology detection device may deliver a bus voltage adjustment instruction to a target reference device in the power supply system, so that the target reference device adjusts a voltage of a bus connected to the target reference device. Then, the topology detection device may determine, based on a difference between an initial bus voltage of a bus connected to a plurality of to-be-grouped devices and a current bus voltage of the bus connected to the plurality of to-be-grouped devices, whether the target reference device and a target to-be-grouped device are connected to a same bus. Apparently, with this solution, the topology detection device may identify a topological structure between the to-be-grouped device and a bus in the power supply system based on a change of a bus voltage.

Figure 2:
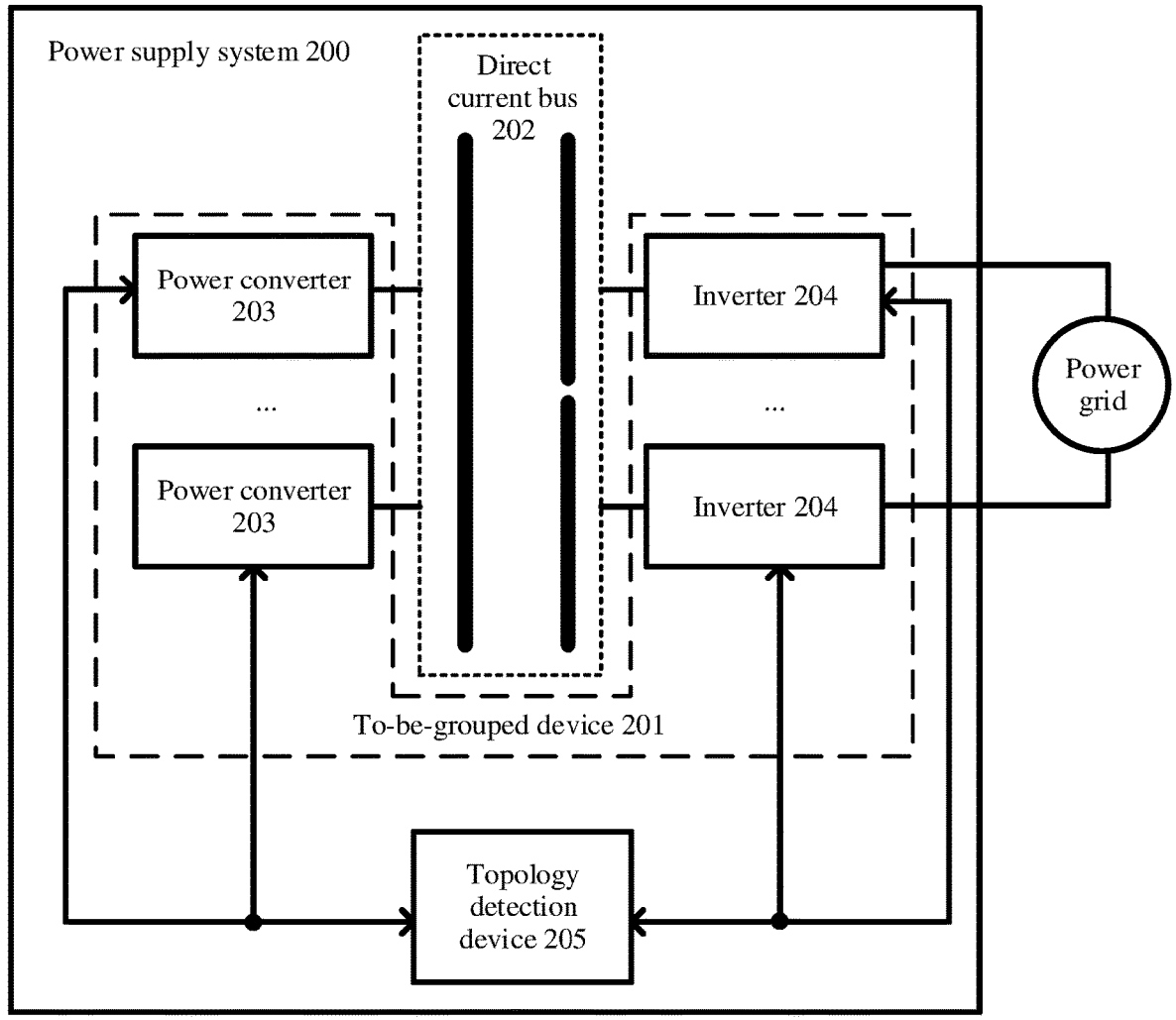
FIG. 2 is a schematic diagram of a structure of a power supply system.

FIG. 2 shows a power supply system 200 according to an embodiment. As shown in FIG. 2, the power supply system 200 includes a plurality of to-be-grouped devices 201 and at least one bus 202. Each bus is connected to at least one to-be-grouped device 201. The to-be-grouped device may include the following types of devices: a power converter 203 and an inverter 204. The power converter 203 is configured to output a direct current to the inverter 204. The inverter 204 is configured to: reverse the direct current into an alternating current and transmit the alternating current to a power grid.

Any one of the plurality of to-be-grouped devices 201 is configured to: report an initial bus voltage of a connected bus to a topology detection device 205; and after the topology detection device 205 delivers a bus voltage adjustment instruction to a target reference device, report a current bus voltage of the connected bus to the topology detection device 205. The target reference device is any to-be-grouped device in the power supply system. The topology detection device 205 is any device in the power supply system. The bus voltage adjustment instruction instructs the target reference device to adjust a voltage of the connected bus.

The topology detection device 205 is configured to: obtain the initial bus voltage and the current bus voltage of the bus connected to the plurality of to-be-grouped devices 201, and determine, based on a difference between the initial bus voltage of the bus connected to the plurality of to-be-grouped devices 201 and the current bus voltage of the bus connected to the plurality of to-be-grouped devices, whether the target reference device and a target to-be-grouped device are connected to a same bus.

The target reference device is configured to: receive the bus voltage adjustment instruction and adjust the voltage of the connected bus according to the bus voltage adjustment instruction.

The topology detection device 205 may be any device in the power supply system 200. When the power supply system 200 is a photovoltaic power supply system, the topology detection device 205 may be an inverter, a photovoltaic power converter, an energy storage power converter, or the like. Optionally, the topology detection device 205 may further be a data collection gateway or a communicable device with a data collection function. The data collection gateway may be disposed independently of the to-be-grouped device 201, or inside the to-be-grouped device 201 such as the power converter 203 or the inverter 204, and may obtain, through the data collection gateway, the initial bus voltage and the current bus voltage of the bus connected to the plurality of to-be-grouped devices 201, to implement functions of the topology detection device 205 and thus identify a topological structure between the to-be-grouped device 201 and the bus 202 in the power supply system 200.

When the power supply system 200 is a photovoltaic power supply system, the power converter 203 may include a photovoltaic power converter and an energy storage power converter. The photovoltaic power converter is configured to convert unstable electric energy generated by a photovoltaic panel into a stable, voltage-controllable, and highly efficient direct current for output. The photovoltaic power converter may implement an MPPT function, to ensure that the photovoltaic panel in the photovoltaic power supply system outputs the maximum power. The energy storage power converter is configured to directly store direct currents output by various types of power converters in a battery, and when electric energy output by various types of power converters is insufficient, gradually discharge the energy stored in the battery.

In addition, the embodiments may not be limited to a photovoltaic power supply system, and may further be a wind power supply system, a tidal energy power supply system, or the like. A person skilled in the art should know this, and details are not described herein again.

The at least one bus 202 is connected to at least one to-be-grouped device 201, and the to-be-grouped device 201 may be connected to at least one bus. The topology detection device 205 may first obtain the initial bus voltage of the bus connected to the plurality of to-be-grouped devices 201. In a process of obtaining the initial bus voltage of the connected bus, the topology detection device 205 delivers an instruction for obtaining a voltage to the at least one to-be-grouped device 201, to obtain the initial bus voltage of the bus connected to each of the to-be-grouped devices 201, and store the initial bus voltage of each of the to-be-grouped devices 201. There may be a bus voltage detection apparatus on the to-be-grouped device 201. The bus voltage detection apparatus is configured to detect a bus voltage on the bus connected to the to-be-grouped device. A person skilled in the art should know a circuit structure and a detection manner of the bus voltage detection apparatus. This is not limited herein.

The topology detection device 205 delivers the bus voltage adjustment instruction to the target reference device after obtaining the initial bus voltage of the bus connected to the plurality of to-be-grouped devices 201. The voltage adjustment instruction instructs the to-be-grouped device 201 to adjust the voltage of the connected bus. After the adjustment is completed, the topology detection device 205 may again send an instruction for obtaining the current bus voltage to the plurality of to-be-grouped devices 201, so as to calculate, based on the initial bus voltage of the bus connected to the plurality of to-be-grouped devices 201 and the current bus voltage of the bus connected to the plurality of to-be-grouped devices 201, a difference between bus voltages of buses connected to the plurality of to-be-grouped devices 201. Therefore, when the voltage of the bus connected to the target reference device changes, a voltage of a bus connected to the target to-be-grouped device also changes correspondingly. In this way, it can be determined whether the target reference device and the target to-be-grouped device are connected to the same bus. A topological relationship of each of the to-be-grouped devices 201 in the power supply system 200 can then be determined. After a topological relationship between the target to-be-grouped device and the target reference device is determined, the target to-be-grouped device whose topological relationship has been determined is excluded from the plurality of to-be-grouped devices 201, and a topological relationship of another to-be-grouped device 201 is determined again. A step of determining the topological relationship is based on a same concept as the manner limited in the foregoing embodiment. This is not limited herein.

To prevent a topology detection error caused by a different voltage of the bus connected to each of the to-be-grouped devices 201 before topology detection is performed, in some possible implementations, the topology detection device 205 is further configured to: deliver a bus reset instruction to each of the to-be-grouped devices before obtaining the initial bus voltage of the bus connected to the plurality of to-be-grouped devices 201. The bus reset instruction instructs each of the to-be-grouped devices to adjust the voltage of the connected bus to a preset voltage.

Any one of the plurality of to-be-grouped devices is further configured to: receive the bus reset instruction and adjust the voltage of the connected bus to the preset voltage according to the bus reset instruction.

Each of the to-be-grouped devices 201 is connected to a different bus, and each bus is connected to a different power grid. Therefore, before the initial bus voltage of the bus connected to the plurality of to-be-grouped devices 201 is obtained, the voltage of the bus connected to each of the to-be-grouped devices 201 is different due to a change of a load of a power grid or the like. To resolve the foregoing problem, the bus reset instruction may be delivered to each of the to-be-grouped devices, so that each of the to-be-grouped devices adjusts the voltage of the connected bus to the preset voltage, and voltages on all buses 202 in the power supply system 200 are adjusted to a same voltage value. In this way, no topology detection error is caused in subsequent topology detection. The preset voltage may be an average voltage value of all buses 202, or a same voltage value with a largest quantity on bus voltages of all buses 202. The foregoing manner may reduce a quantity of buses whose voltages need to be adjusted and increase a topology detection speed.

An action of adjusting the voltage of the connected bus by the target reference device is not performed instantaneously. Therefore, to ensure accuracy of topology detection, in some possible implementations, the target reference device is further configured to: send a voltage adjustment completion message to the topology detection device 205 after adjusting the voltage of the connected bus from a first bus voltage to a second bus voltage. The topology detection device 205 is further configured to: before obtaining the current bus voltage of the bus connected to the plurality of to-be-grouped devices, receive the voltage adjustment completion message sent by the target reference device. The voltage adjustment completion message is used to inform that the target reference device adjusts the voltage of the connected bus from the first bus voltage to the second bus voltage, and the second bus voltage is different from the first bus voltage. After determining that the target reference device adjusts the voltage of the connected bus from the first bus voltage to the second bus voltage, the topology detection device 205 obtains the current bus voltage of the bus connected to the plurality of to-be-grouped devices. This can ensure that the target reference device has adjusted the voltage of the connected bus from the first bus voltage to the second bus voltage during topology detection, and further improve the speed of topology detection.

The target reference device adjusts the voltage of the connected bus from the first bus voltage to the second bus voltage, resulting in a power loss. However, if the adjusted bus voltage has a relatively small amplitude, the bus voltage detection apparatus on each of the to-be-grouped devices 201 is prone to missed detection. Therefore, in some possible implementations, a difference between the second bus voltage and the first bus voltage is greater than a specified threshold, or a ratio of the second bus voltage to the first bus voltage is a specified ratio. The specified threshold or the specified ratio may be related to voltage detection precision of the bus voltage detection apparatus. In this way, the difference between the second bus voltage and the first bus voltage can be identified by the bus voltage detection apparatus, so that topology detection can be implemented in a case of low power consumption.

Figure 3A:
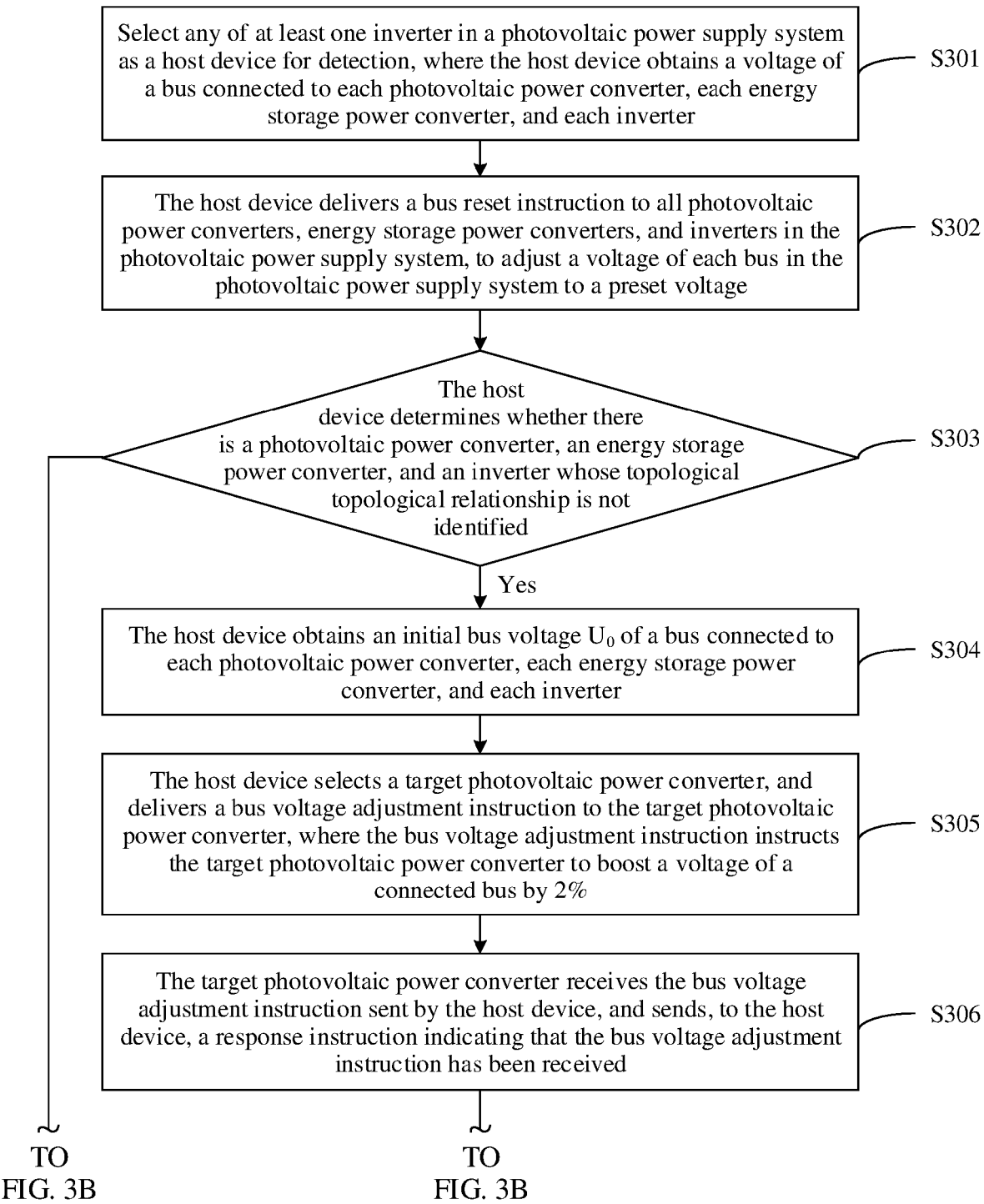
FIG. 3A and FIG. 3B are schematic flowcharts of a method for implementing topology detection in a photovoltaic power supply system.
Figure 3B:
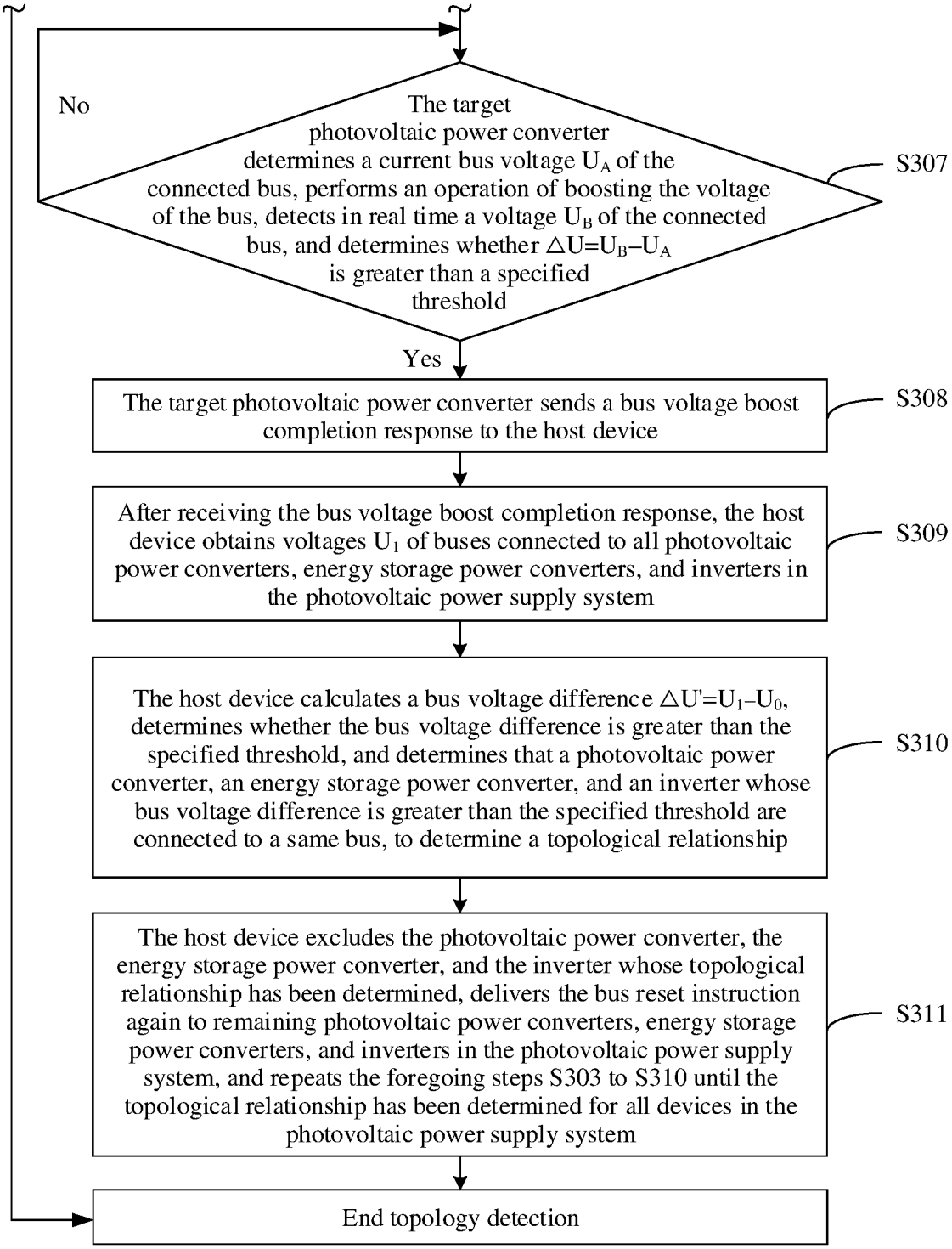

For example, the embodiments may provide an instance of performing topology detection on a photovoltaic power supply system. The photovoltaic power supply system includes at least one photovoltaic power converter, at least one energy storage power converter, and at least one inverter. The photovoltaic power converter, the energy storage power converter, and the inverter are connected through a plurality of buses. Refer to FIG. 3A and FIG. 3B. A method for implementing the topology detection by the photovoltaic power supply system includes the following steps:

S301: Select any of the at least one inverter in the photovoltaic power supply system as a host device for detection, where the host device obtains a voltage of a bus connected to each photovoltaic power converter, each energy storage power converter, and each inverter.

S302: The host device delivers a bus reset instruction to all photovoltaic power converters, energy storage power converters, and inverters in the photovoltaic power supply system, to adjust a voltage of each bus in the photovoltaic power supply system to a preset voltage.

S303: The host device determines whether there is a photovoltaic power converter, an energy storage power converter, and an inverter whose topological relationship is not identified. If there is a photovoltaic power converter, an energy storage power converter, and an inverter whose topological relationship is not identified, the host device performs S304. If there is no photovoltaic power converter, energy storage power converter, or inverter whose topological relationship is not identified, the host device ends topology detection.

S304: The host device obtains an initial bus voltage $U_0$ of a bus connected to each photovoltaic power converter, each energy storage power converter, and each inverter.

S305: The host device selects a target photovoltaic power converter from the at least one photovoltaic power converter and delivers a bus voltage adjustment instruction to the target photovoltaic power converter, where the bus voltage adjustment instruction instructs the target photovoltaic power converter to boost a voltage of a connected bus by 2%. The 2% bus voltage is a specified threshold.

S306: The target photovoltaic power converter receives the bus voltage adjustment instruction sent by the host device, and sends, to the host device, a response instruction indicating that the bus voltage adjustment instruction has been received.

S307: The target photovoltaic power converter determines a current bus voltage $U_A$ of the connected bus, performs an operation of boosting the voltage of the bus, detects in real time a voltage $U_B$ of the connected bus, determines whether $\Delta U = U_B - U_A$ is greater than the specified threshold, and performs step S308 when $\Delta U = U_B - U_A$ is greater than the specified threshold.

S308: The target photovoltaic power converter sends a bus voltage boost completion response to the host device.

S309: After receiving the bus voltage boost completion response, the host device obtains voltages $U_1$ of buses connected to all photovoltaic power converters, energy storage power converters, and inverters in the photovoltaic power supply system.

S310: The host device calculates a bus voltage difference $\Delta U' = U_1 - U_0$, determines whether the bus voltage difference is greater than the specified threshold, and determines that a photovoltaic power converter, an energy storage power converter, and an inverter whose bus voltage difference is greater than the specified threshold are connected to a same bus, so as to determine a topological relationship.

In addition, to ensure accuracy of the topology detection, the host device may further send the bus voltage adjustment instruction to the target photovoltaic power converter for a plurality of times. See S305 to S309. The host device determines that a photovoltaic power converter, an energy storage power converter, and an inverter whose bus voltage differences calculated for a plurality of times are all greater than the specified threshold are connected to a same bus.

S311: The host device excludes the photovoltaic power converter, the energy storage power converter, and the inverter whose topological relationship has been determined, delivers the bus reset instruction again to remaining photovoltaic power converters, energy storage power converters, and inverters in the photovoltaic power supply system, and repeats the foregoing steps S303 to S310 until the topological relationship has been determined for all devices in the photovoltaic power supply system.

According to the power supply system provided in this embodiment, the target reference device is enabled to adjust the voltage of the bus by obtaining the initial bus voltage of the bus connected to the plurality of to-be-grouped devices and delivering the bus voltage adjustment instruction to the target reference device. The initial bus voltage of the bus connected to the plurality of to-be-grouped devices and the current bus voltage of the bus connected to the plurality of to-be-grouped devices are then obtained. It is determined, based on the difference between the initial bus voltage of the bus connected to the plurality of to-be-grouped devices and the current bus voltage of the bus connected to the plurality of to-be-grouped devices, whether the target reference device and the target to-be-grouped device are connected to the same bus. A topological structure of the to-be-grouped device in the power supply system can then be identified.

Embodiment 2

An embodiment further provides a power supply system. In this solution, a topology detection device may deliver a bus disturbance instruction to a target reference device, so that the target reference device generates a voltage disturbance on a connected bus, and determine, based on a relationship between a voltage disturbance frequency of a bus connected to a plurality of to-be-grouped devices and a specified frequency threshold, whether the target reference device and a target to-be-grouped device are connected to a same bus, so that a topological structure of the to-be-grouped device in the power supply system can be identified. Apparently, with this solution, the topology detection device may identify a topological structure between the to-be-grouped device and a bus in the power supply system based on disturbance of a bus voltage.

Figure 4:
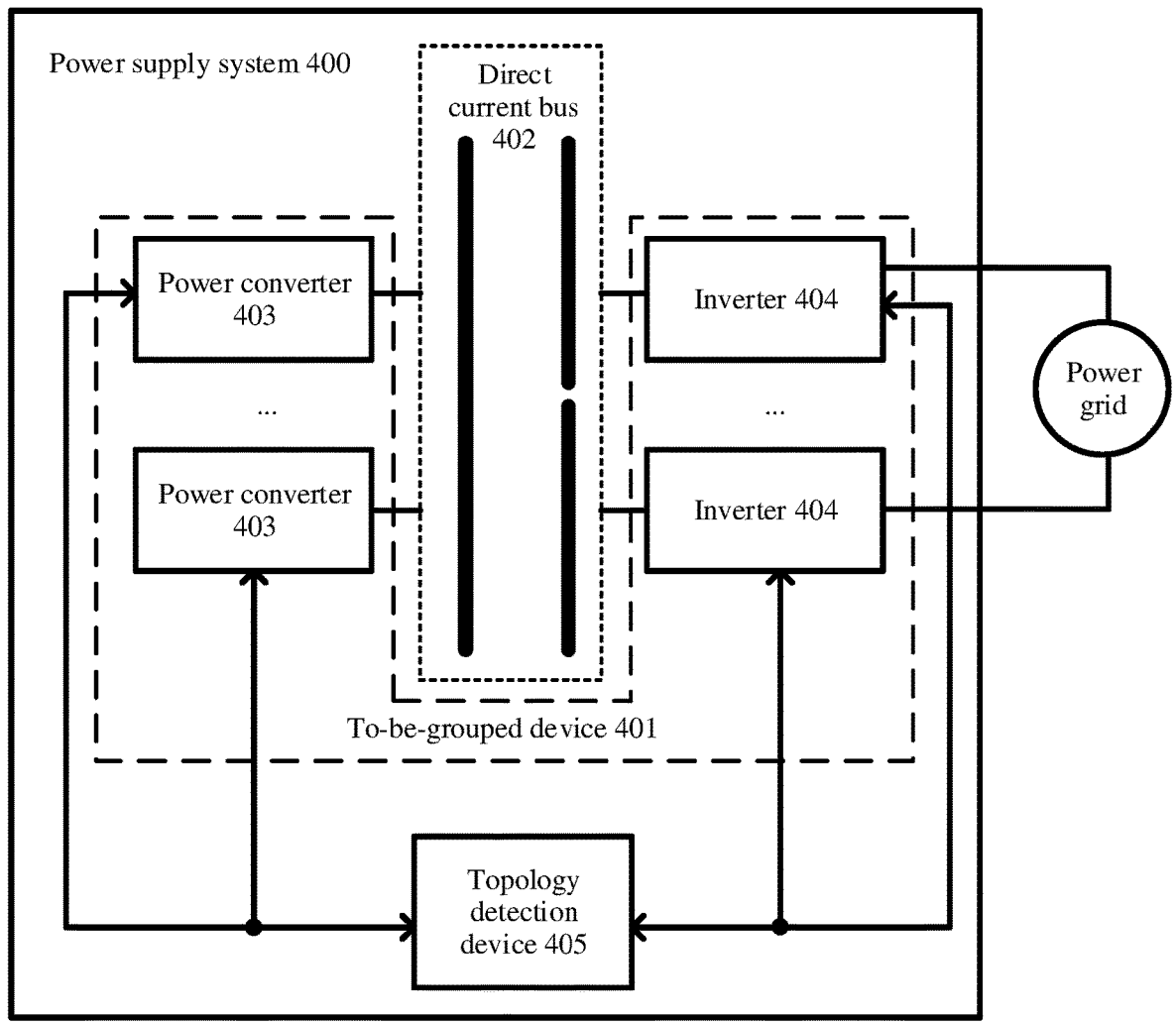
FIG. 4 is a schematic diagram of a structure of another power supply system.

FIG. 4 shows a power supply system 400 according to an embodiment. As shown in FIG. 4, the power supply system 400 includes a plurality of to-be-grouped devices 401 and at least one bus 402. Each bus is connected to at least one to-be-grouped device 401. The to-be-grouped device 401 includes: a power converter 403 and an inverter 404. The power converter 403 is configured to output a direct current to the inverter 404. The inverter 404 is configured to: reverse the direct current into an alternating current and transmit the alternating current to a power grid.

Any one of the plurality of to-be-grouped devices 401 is configured to: after a topology detection device 405 delivers a bus disturbance instruction to a target reference device, report a voltage disturbance frequency on a connected bus to the topology detection device 405. The target reference device is any to-be-grouped device in the power supply system 400. The topology detection device 405 is any device in the power supply system 400. The bus disturbance instruction instructs the target reference device to continuously generate a voltage disturbance on the connected bus.

The topology detection device 405 is configured to: obtain the voltage disturbance frequency of the bus connected to the plurality of to-be-grouped devices 401, and determine, based on a relationship between the voltage disturbance frequency of the bus connected to the plurality of to-be-grouped devices 401 and a specified frequency threshold, whether the target reference device and a target to-be-grouped device are connected to a same bus.

The target reference device is configured to: receive the bus disturbance instruction and perform a voltage disturbance action according to the bus disturbance instruction, so that the target reference device generates the voltage disturbance on the connected bus.

For description of the power supply system 400 and the devices in the power supply system 400 in this embodiment, refer to Embodiment 1. Details are not described herein again.

The topology detection device 405 first delivers the bus disturbance instruction to the target reference device, so that the target reference device continuously generates the voltage disturbance on the connected bus, and determines, based on the relationship between the voltage disturbance frequency of the bus connected to the plurality of to-be-grouped devices and a specified frequency threshold, whether the target reference device and the target to-be-grouped device are connected to the same bus. That is, for a target to-be-grouped device with a bus voltage disturbance frequency greater than the specified frequency threshold (a disturbance frequency generated on the connected bus by the target reference device), it indicates that when the bus connected to the target reference device has the voltage disturbance, the bus connected to the target to-be-grouped device also has a corresponding voltage disturbance. Therefore, it may be determined that the target reference device and the target to-be-grouped device are connected to the same bus. In this way, a topological relationship of the to-be-grouped devices 401 in the power supply system 400 may be determined. In some examples, the voltage disturbance may be in a form of a rectangular wave, a sawtooth wave, a step wave, or the like. The form of the voltage disturbance is not limited herein.

To ensure accuracy of topology detection, in some possible implementations, the target reference device is further configured to: send a disturbance generation completion message to the topology detection device 405 after performing the voltage disturbance action according to the bus disturbance instruction. The topology detection device 405 is further configured to: before obtaining the voltage disturbance frequency of the bus connected to the plurality of to-be-grouped devices 401, receive the disturbance generation completion message sent by the target reference device. The disturbance generation completion message is used to inform that the target reference device generates the voltage disturbance on the connected bus. After determining that the target reference device generates the voltage disturbance on the connected bus, the topology detection device 405 obtains the voltage disturbance frequency of the bus connected to the plurality of to-be-grouped devices. This can ensure that the target reference device has generated the voltage disturbance on the connected bus during topology detection, and further improve the speed of topology detection.

The target reference device generates the voltage disturbance on the connected bus, resulting in a power loss. However, if the adjusted voltage disturbance frequency is excessively low, missed detection is prone to occur. Therefore, in some possible implementations, a voltage disturbance frequency of the bus connected to the target reference device is greater than the specified frequency threshold. The specified frequency threshold may be related to frequency detection precision. In this way, the voltage disturbance generated by the target reference device on the connected bus may be identified, so that topology detection can be implemented in a case of low power consumption.

To further reduce electric energy consumption, in some possible implementations, the topology detection device 405 is further configured to: deliver a bus disturbance cancellation instruction to the target reference device after obtaining the voltage disturbance frequency of the bus connected to the plurality of to-be-grouped devices. The bus disturbance cancellation instruction instructs the target reference device to no longer generate the voltage disturbance on the connected bus. In this way, after it is determined that the target reference device and the target to-be-grouped device are connected to the same bus, energy consumption caused by bus disturbance may be reduced.

Figure 5A:
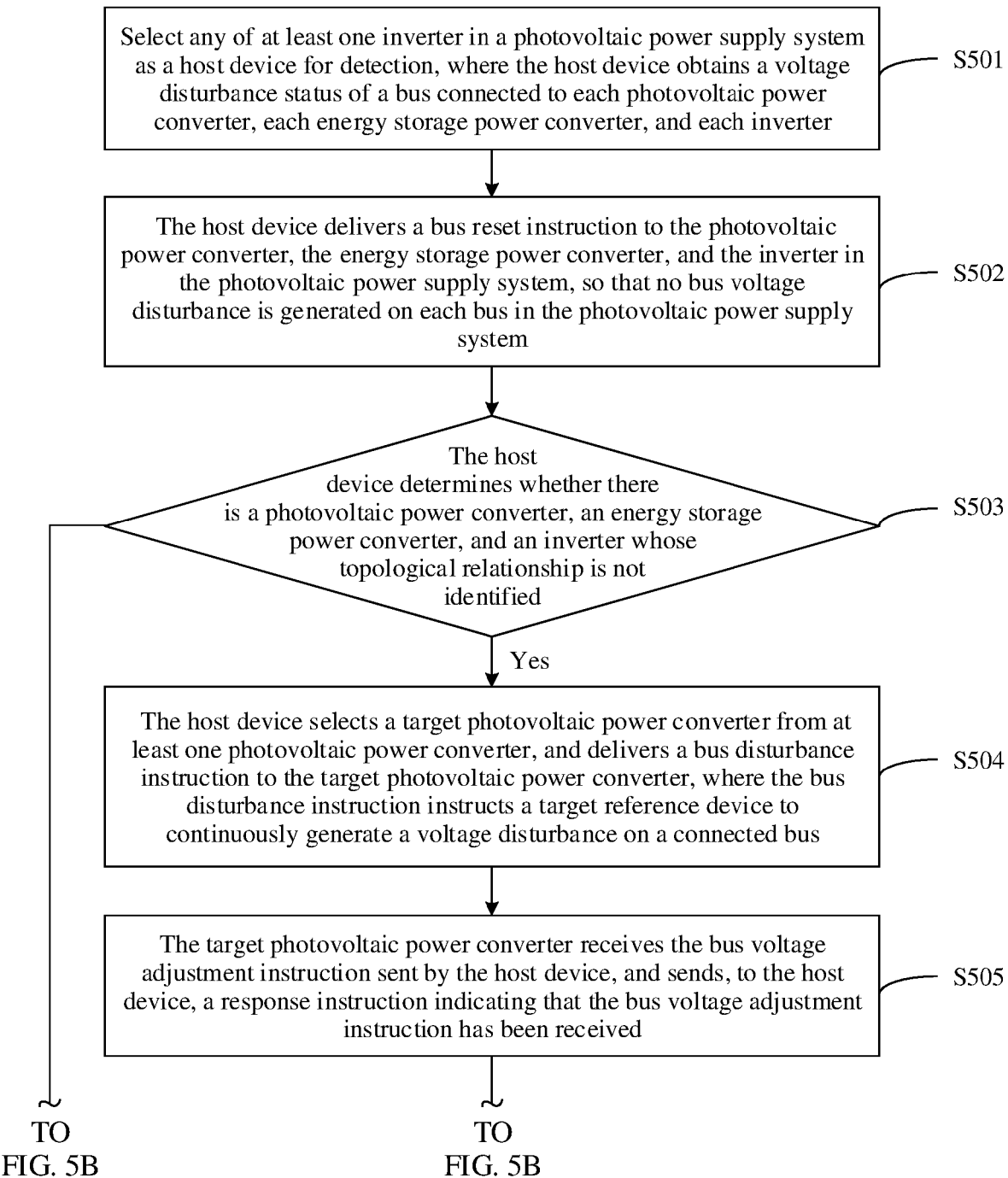
FIG. 5A and FIG. 5B are schematic flowcharts of another method for implementing topology detection in a photovoltaic power supply system.
Figure 5B:
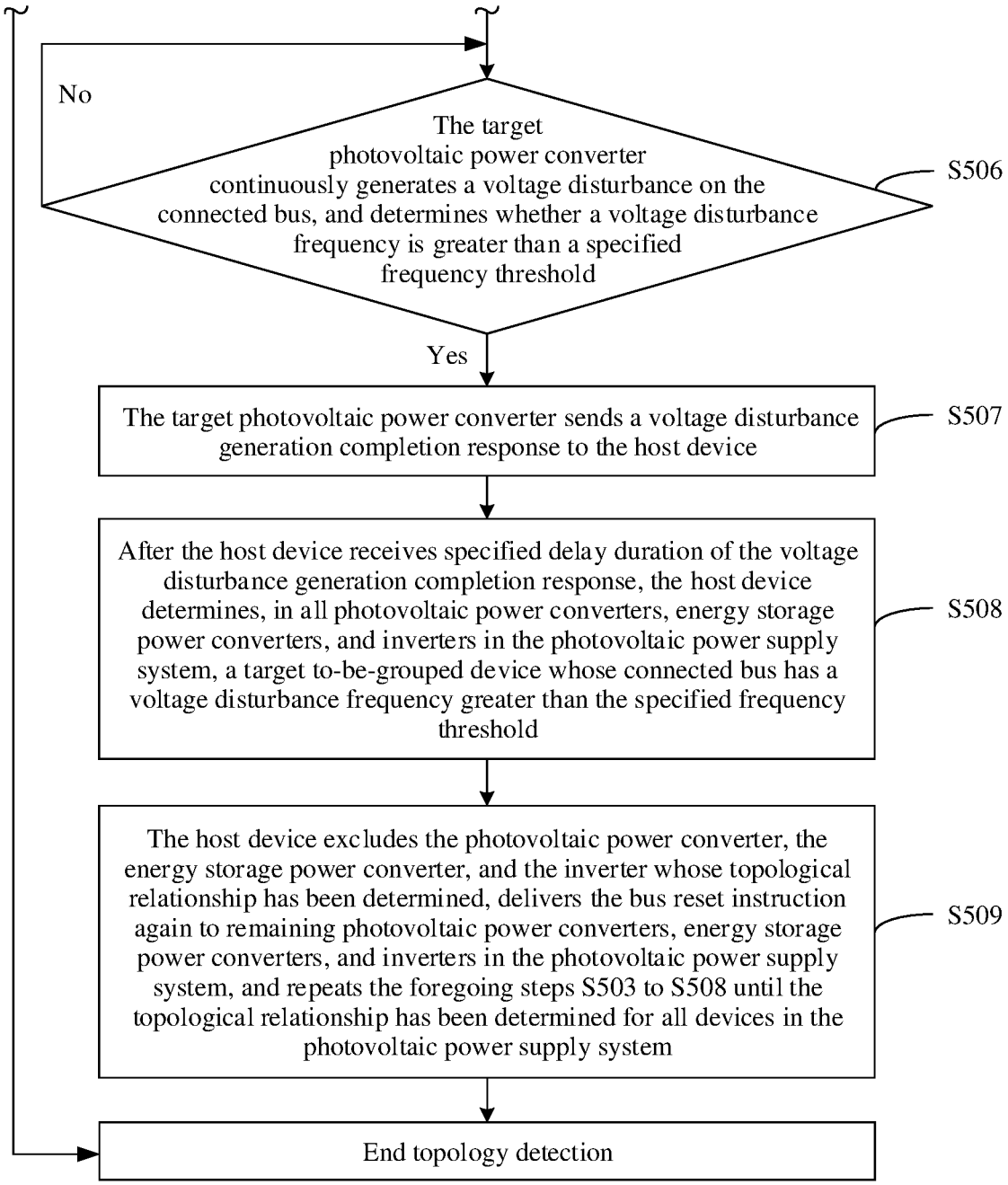

For example, the embodiments may provide an instance of performing topology detection on a photovoltaic power supply system. The photovoltaic power supply system includes at least one photovoltaic power converter, at least one energy storage power converter, and at least one inverter. The photovoltaic power converter, the energy storage power converter, and the inverter are connected through a plurality of buses. Refer to FIG. 5A and FIG. 5B. A method for implementing the topology detection by the photovoltaic power supply system includes the following steps:

S501: Select any of the at least one inverter in the photovoltaic power supply system as a host device for detection, where the host device obtains a voltage disturbance status of a bus connected to each photovoltaic power converter, each energy storage power converter, and each inverter.

S502: The host device delivers a bus reset instruction to all photovoltaic power converters, energy storage power converters, and inverters in the photovoltaic power supply system, so that no bus voltage disturbance is generated on each bus in the photovoltaic power supply system.

S503: The host device determines whether there is a photovoltaic power converter, an energy storage power converter, and an inverter whose topological relationship is not identified. If there is a photovoltaic power converter, an energy storage power converter, and an inverter whose topological relationship is not identified, the host device performs S504. If there is no photovoltaic power converter, energy storage power converter, or inverter whose topological relationship is not identified, the host device ends topology detection.

S504: The host device selects a target photovoltaic power converter from the at least one photovoltaic power converter and delivers a bus disturbance instruction to the target photovoltaic power converter, where the bus disturbance instruction instructs the target reference device to continuously generate a voltage disturbance on the connected bus.

S505: The target photovoltaic power converter receives the bus disturbance instruction sent by the host device, and sends, to the host device, a response instruction indicating that the bus disturbance instruction has been received.

S506: The target photovoltaic power converter continuously generates a voltage disturbance on the connected bus, determines whether a voltage disturbance frequency is greater than a specified frequency threshold, and performs step S507 when the voltage disturbance frequency is greater than the specified frequency threshold.

S507: The target photovoltaic power converter sends a voltage disturbance generation completion response to the host device.

S508: After the host device receives specified delay duration of the voltage disturbance generation completion response, the host device determines, in all photovoltaic power converters, energy storage power converters, and inverters in the photovoltaic power supply system, a target to-be-grouped device whose connected bus has a voltage disturbance frequency greater than the specified frequency threshold.

S509: The host device excludes the photovoltaic power converter, the energy storage power converter, and the inverter whose topological relationship has been determined, delivers the bus reset instruction again to remaining photovoltaic power converters, energy storage power converters, and inverters in the photovoltaic power supply system, and repeats the foregoing steps S503 to S508 until the topological relationship has been determined for all devices in the photovoltaic power supply system.

By using the power supply system provided in this embodiment, the bus disturbance instruction may be delivered to the target reference device, so that the target reference device generates the voltage disturbance on the connected bus, and whether the target reference device and the target to-be-grouped device are connected to the same bus is determined based on the relationship between the voltage disturbance frequency of the bus connected to the plurality of to-be-grouped devices and the specified frequency threshold. In this way, the topological structure of the to-be-grouped device in the power supply system can be identified.

An embodiment further provides a topology detection method, applied to the topology detection device 205 provided in Embodiment 1. The method includes: obtaining an initial bus voltage and a current bus voltage of a bus connected to a plurality of to-be-grouped devices; and determining, based on a difference between the initial bus voltage of the bus connected to the plurality of to-be-grouped devices and the current bus voltage of the bus connected to the plurality of to-be-grouped devices, whether a target reference device and a target to-be-grouped device are connected to a same bus. For beneficial effects of this embodiment, refer to the description in Embodiment 1. This is not limited herein.

An embodiment further provides a topology detection method, applied to the topology detection device 405 provided in Embodiment 2. The method includes: obtaining a voltage disturbance frequency of a bus connected to a plurality of to-be-grouped devices; and determining, based on a relationship between the voltage disturbance frequency of the bus connected to the plurality of to-be-grouped devices and a specified frequency threshold, whether a target reference device and a target to-be-grouped device are connected to a same bus. For beneficial effects of this embodiment, refer to the description in Embodiment 2. This is not limited herein.

A person skilled in the art should understand that the embodiments may be provided as a method, a system, or a computer program product. Therefore, there may be hardware only embodiments, software only embodiments, or embodiments with a combination of software and hardware.

In addition, the embodiments may be implemented in a form of a computer program product that is implemented on one or more computer-usable storage media (including but not limited to a disk memory, a CD-ROM, an optical memory, and the like) that include computer-usable program code.

The embodiments may be described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a function in one or more processes in the flowcharts and/or in one or more blocks in the block diagrams.

These computer program instructions may alternatively be stored in a computer-readable memory that can instruct a computer or another programmable data processing device to work so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations without departing from the scope of the embodiments. The embodiments are intended to cover these modifications and variations.

What is claimed is:

1. A power supply system, comprising:
a plurality of to-be-grouped devices; and
at least one bus, wherein each bus is connected to at least one to-be-grouped device, the to-be-grouped device comprises a power converter and an inverter, the power converter is configured to output a direct current to the inverter, and the inverter is configured to reverse the direct current into an alternating current and transmit the alternating current to a power grid;
any one of the plurality of to-be-grouped devices is configured to:
report an initial bus voltage of a connected bus to a topology detection device; and
after the topology detection device delivers a bus voltage adjustment instruction to a target reference device, report a current bus voltage of the connected bus to the topology detection device, wherein the target reference device is any to-be-grouped device in the power supply system, the topology detection device is any device in the power supply system, and the bus voltage adjustment instruction instructs the target reference device to adjust a voltage of the connected bus;
the target reference device is configured to:
receive the bus voltage adjustment instruction, and
adjust the voltage of the connected bus according to the bus voltage adjustment instruction; and
the topology detection device is configured to:
obtain the initial bus voltage and the current bus voltage of the bus connected to the plurality of to-be-grouped devices, and
determine, based on a difference between the initial bus voltage of the bus connected to the plurality of to-be-grouped devices and the current bus voltage of the bus connected to the plurality of to-be-grouped devices, whether the target reference device and a target to-be-grouped device are connected to a same bus.

2. The power supply system according to claim 1, wherein the topology detection device is further configured to:
deliver a bus reset instruction to each of the to-be-grouped devices before obtaining the initial bus voltage of the bus connected to the plurality of to-be-grouped devices; the bus reset instruction instructs each of the to-be-grouped devices to adjust the voltage of the connected bus to a preset voltage; and
any one of the plurality of to-be-grouped devices is further configured to:
receive the bus reset instruction, and
adjust the voltage of the connected bus to the preset voltage according to the bus reset instruction.

3. The power supply system according to claim 2, wherein the target reference device is further configured to:
send a voltage adjustment completion message to the topology detection device after adjusting the voltage of the connected bus from a first bus voltage to a second bus voltage; and
the topology detection device is further configured to:
before obtaining the current bus voltage of the bus connected to the plurality of to-be-grouped devices, receive the voltage adjustment completion message sent by the target reference device, wherein
the voltage adjustment completion message is used to inform that the target reference device adjusts the voltage of the connected bus from the first bus voltage to the second bus voltage, and the second bus voltage is different from the first bus voltage.

4. The power supply system according to claim 3, wherein a difference between the second bus voltage and the first bus voltage is greater than a specified threshold; or
a ratio of the second bus voltage to the first bus voltage is a specified ratio.

5. The power supply system according to claim 4, wherein the target reference device is further configured to:
send a disturbance generation completion message to the topology detection device after performing the voltage disturbance action according to the bus disturbance instruction; and
the topology detection device is further configured to:
before obtaining the voltage disturbance frequency of the bus connected to the plurality of to-be-grouped devices, receive the disturbance generation completion message sent by the target reference device, wherein the disturbance generation completion message is used to inform that the target reference device generates the voltage disturbance on the connected bus.

6. The power supply system according to claim 5, wherein the topology detection device is further configured to:
deliver a bus disturbance cancellation instruction to the target reference device after obtaining the voltage disturbance frequency of the bus connected to the plurality of to-be-grouped devices, and the bus disturbance cancellation instruction instructs the target reference device to no longer generate the voltage disturbance on the connected bus.

7. The power supply system according to claim 4, wherein a voltage disturbance frequency of a bus connected to the target reference device is greater than a specified frequency threshold.

8. The power supply system according to claim 7, wherein the topology detection device is further configured to:
deliver a bus disturbance cancellation instruction to the target reference device after obtaining the voltage disturbance frequency of the bus connected to the plurality of to-be-grouped devices, and the bus disturbance cancellation instruction instructs the target reference device to no longer generate the voltage disturbance on the connected bus.

9. The power supply system according to claim 1, wherein the target reference device is further configured to:
send a voltage adjustment completion message to the topology detection device after adjusting the voltage of the connected bus from a first bus voltage to a second bus voltage; and
the topology detection device is further configured to:
before obtaining the current bus voltage of the bus connected to the plurality of to-be-grouped devices, receive the voltage adjustment completion message sent by the target reference device, wherein
the voltage adjustment completion message is used to inform that the target reference device adjusts the voltage of the connected bus from the first bus voltage to the second bus voltage, and the second bus voltage is different from the first bus voltage.

10. The power supply system according to claim 9, wherein a difference between the second bus voltage and the first bus voltage is greater than a specified threshold; or
a ratio of the second bus voltage to the first bus voltage is a specified ratio.

11. The power supply system according to claim 1, wherein the power converter comprises at least one of the following: a photovoltaic power converter and an energy storage power converter.

12. The power supply system according to claim 11, wherein a voltage disturbance frequency of a bus connected to the target reference device is greater than a specified frequency threshold.

13. The power supply system according to claim 12, wherein the topology detection device is further configured to:
deliver a bus disturbance cancellation instruction to the target reference device after obtaining the voltage disturbance frequency of the bus connected to the plurality of to-be-grouped devices, and the bus disturbance cancellation instruction instructs the target reference device to no longer generate the voltage disturbance on the connected bus.

14. A power supply system, comprising:
a plurality of to-be-grouped devices; and
at least one bus, wherein each bus is connected to at least one to-be-grouped device, the to-be-grouped device comprises: a power converter and an inverter, the power converter is configured to output a direct current to the inverter, and the inverter is configured to: reverse the direct current into an alternating current and transmit the alternating current to a power grid;
any one of the plurality of to-be-grouped devices is configured to: after a topology detection device delivers a bus disturbance instruction to a target reference device, report a voltage disturbance frequency on a connected bus to the topology detection device, wherein the target reference device is any to-be-grouped device in the power supply system, the topology detection device is any device in the power supply system, and the bus disturbance instruction instructs the target reference device to continuously generate a voltage disturbance on the connected bus;
the target reference device is configured to:
receive the bus disturbance instruction, and
perform a voltage disturbance action according to the bus disturbance instruction, so that the target reference device generates the voltage disturbance on the connected bus; and
the topology detection device is configured to:
obtain the voltage disturbance frequency of the bus connected to the plurality of to-be-grouped devices, and
determine, based on a relationship between the voltage disturbance frequency of the bus connected to the plurality of to-be-grouped devices and a specified frequency threshold, whether the target reference device and a target to-be-grouped device are connected to a same bus.

15. The power supply system according to claim 14, wherein the topology detection device is further configured to:
deliver a bus disturbance cancellation instruction to the target reference device after obtaining the voltage disturbance frequency of the bus connected to the plurality of to-be-grouped devices, and the bus disturbance cancellation instruction instructs the target reference device to no longer generate the voltage disturbance on the connected bus.

16. The power supply system according to claim 14, wherein the power converter comprises at least one of the following: a photovoltaic power converter and an energy storage power converter.

17. A topology detection method, comprising:
obtaining an initial bus voltage and a current bus voltage of a bus connected to a plurality of to-be-grouped devices; and
determining, based on a difference between the initial bus voltage of the bus connected to the plurality of to-be-grouped devices and the current bus voltage of the bus connected to the plurality of to-be-grouped devices, whether a target reference device and a target to-be-grouped device are connected to a same bus.

* * * * *